United States Patent [19]

Easwaran et al.

[11] 3,973,061
[45] Aug. 3, 1976

[54] METHOD FOR THE PREPARATION OF POROUS FERROUS METAL IMPREGNATED WITH MAGNESIUM METAL

[75] Inventors: Jairaj Easwaran, Toledo, Ohio; George S. Foerster, Hightstown, N.J.

[73] Assignee: NL Industries, Inc., New York, N.Y.

[22] Filed: Mar. 25, 1975

[21] Appl. No.: 561,847

Related U.S. Application Data

[60] Division of Ser. No. 454,951, March 26, 1974, Pat. No. 3,902,892, which is a continuation-in-part of Ser. No. 385,584, Aug. 3, 1973, abandoned.

[52] U.S. Cl............................... 427/319; 75/44 S; 75/58; 75/130 A; 264/111; 264/434; 427/329; 427/334; 427/398; 427/431; 427/436; 427/443
[51] Int. Cl.² .......................................... C23C 1/00
[58] Field of Search ........... 427/243, 247, 319, 329, 427/431, 436, 443, 314, 318, 327, 328, 334, 398, 430, 435; 264/111, 129, 134, 137, 136; 75/58, 130 A, 130 B, 130 C, .5 R, 44 R, 44 S; 29/191.2

[56] References Cited
UNITED STATES PATENTS

| | | | |
|---|---|---|---|
| 1,491,392 | 4/1924 | Graham | 75/44 R |
| 2,675,308 | 4/1954 | Millis et al. | 75/125 |
| 2,839,393 | 6/1958 | Kawabata | 75/130 B |
| 2,881,068 | 4/1959 | Bergh | 75/130 C |
| 3,017,267 | 1/1962 | Bartson et al. | 75/130 B |
| 3,549,541 | 8/1969 | Hohl et al. | 75/130 B |
| 3,634,066 | 1/1972 | Matthews | 75/65 R |
| 3,656,989 | 4/1972 | Layland | 427/431 |

*Primary Examiner*—Thomas J. Herbert, Jr.
*Assistant Examiner*—Bruce H. Hess

[57] ABSTRACT

A composition of matter comprising a mass of ferrous scrap pieces compressed together in random orientation forming a network of interlocking pieces has been prepared. The ferrous metal network has a density of 1.2 to 4.0 g/cc, a porosity of 50% to 85% and a short transverse tensile strength (S.T.T.S.) of at least 2 psi, preferably at least 2.5 psi.

This ferrous metal network may be impregnated with magnesium in amount from 18 to 55% by weight of the impregnated body. The magnesium impregnated body is useful for treating high melting metals such as ferrous metal to reduce the sulphur content or to produce nodular iron.

5 Claims, No Drawings

METHOD FOR THE PREPARATION OF POROUS FERROUS METAL IMPREGNATED WITH MAGNESIUM METAL

This application is a division of our application Ser. No. 454,951 filed Mar. 26, 1974, now U.S. Pat. No. 3,902,892, which in turn is a continuation-in-part of our parent application Ser. No. 385,584 filed Aug. 3, 1973, now abandoned.

BACKGROUND OF THE INVENTION

In the iron and steel industry, it is necessary to treat the ferrous base metals while in the molten state with a desulfurizing agent to reduce the sulphur content of the metal product. Magnesium metal is a powerful deoxidizer and desulfurizer. However, magnesium metal boils at a low temperature and therefore the sudden increase in volume which is produced when metallic magnesium is added to the molten iron may result in violent reactions as the magnesium metal is vaporized.

Various methods have been used to reduce this violent activity by slowly introducing the magnesium metal into molten ferrous metal under rigidly controlled systems. One of these methods for reducing the violence is to impregnate porous bodies with magnesium metal and to introduce these magnesium impregnated porous bodies into the molten ferrous metal. Under these conditions, the impregnated magnesium metal is released at a slow enough rate that the violence is held to minimum.

Among the known porous bodies which have been used with limited success for this purpose are porous coke, carbon, graphite and ceramic bodies such as quicklime, lump limestone or dolomite and the like.

In addition, magnesium has been infiltrated into porous iron bodies. Among these prior art iron bodies is sponge iron in which the iron particles are very small and are sintered together to form a porous structure. Sponge iron itself is expensive to produce and to use. The cost of forming large porous structures from sponge iron is also an expensive procedure.

Since the pores of the sponge iron are excessively small they tend to release the magnesium too slowly when immersed into the molten iron and the release may be too quiescent for optimum operation. Sponge iron also may contain oxides which may form a violent reaction with the magnesium which may also impair the efficiency.

Another method used by the prior art to produce iron briquettes containing magnesium is to dry press together iron particles and magnesium particles both of which preferably are from 4–60 mesh.

When these compressed iron and magnesium particles are used to desulfurize molten iron, the remaining iron structure becomes decidedly weak as the magnesium melts and therefore the magnesium may be released too quickly and therefore may cause a violent reaction.

In contrast to these prior art products, the instant invention prepares a network of ferrous metal pieces, particularly steel turnings, compressed together which forms a body having a low density, high porosity and high strength which may be infiltrated with large quantities of magnesium metal.

The voids in the metal network are sufficiently large to release the magnesium at a desirable rate, i.e., fast enough to provide rapid treatment but not too fast so that the treatment is unduly violent.

It has been found that the porous ferrous metal network of the instant invention possesses advantages which are not present in the prior art porous bodies.

SUMMARY OF THE INVENTION

A new composition of matter has been prepared comprising a mass of scrap ferrous metal pieces compressed together in random orientation, forming a network of interlocking pieces, said mass having a density of 1.2 to 4.0 g/cc, a porosity of 50 to 85% and a strength of at least 2 psi, preferably at least 2.5 psi.

This mass of porous ferrous metal network contains a labyrinth of interstices in the voids between the compressed interlocking metal pieces. These interstices may be filled with magnesium metal by immersing the ferrous metal network in molten magnesium metal and solidifying the molten metal impregnated throughout the interstices of the porous metal network. The amount of magnesium which may be impregnated into the ferrous metal mass may be from 18 to 55% by weight of the impregnated body. This product is useful for treating ferrous melts, for example, for desulfurizing the melts and also for producing nodular iron. Normally about ¾ to 1½ pounds of magnesium metal are used to desulfurize 1 ton of molten iron. About 2 to 4 more pounds of magnesium are used to form one ton of nodular iron.

DESCRIPTION OF THE PREFERRED EMBODIMENTS

This composition of matter is produced by selecting scrap metal pieces particularly steel turnings which fall within the following size ranges:

| | |
|---|---|
| length | 1/8 to 9 inches |
| width | 1/64 to 1 inch |
| thickness | 1 to 100 mils |

Scrap metal pieces within this size range usually have a bulk density of from 0.1 to 1.0 g/cc.

These metal pieces are then compressed at pressures from 0.5 to 8 tsi (tons per square inch) and they form a ferrous metal network having a density of from 1.2 to 4.0 g/cc. As stated previously the porosity of the network is 50 to 85% and it has a short transverse tensile strength of at least 2 psi.

This ferrous metal network is then immersed into molten magnesium metal and held in the molten metal for a few minutes to impregnate the interstices of the metal network. The impregnated body is removed from the molten magnesium and it is cooled to solidify the molten magnesium.

The impregnated metal is cooled, preferably in the absence of an oxidizing atmosphere. One preferred method of cooling the impregnated compressed metal body, is to immerse the impregnated body into an oil bath.

The final product comprises a porous composition of matter comprising a compacted metal network impregnated with magnesium metal. The composition contains at least 18% magnesium metal by weight of the total impregnated metal body.

The porous ferrous metal network composition of the instant invention when impregnated with magnesium is superior to the porous bodies of the prior art. The instant porous body not only may take up and retain magnesium in amounts greater than about 18% of its total weight, but in addition, when used to desulfurize iron, the porous body releases the magnesium metal over a short period of time without creating a violent reaction. It also has a structural strength which is retained as the magnesium is being released. This is advantageous since the maintenance of the structural strength is necessary to prevent a violent reaction from taking place since the magnesium is released in a controlled manner. In addition, it is also advantageous to employ this particular type of magnesium infiltrated porous body over other types of magnesium impregnated bodies since the residual ferrous metal in the porous body may be dissolved in the molten metal without having to remove the residual carrier. It has also been found that this particular type of ferrous metal body possesses sufficient strength to withstand handling prior to infiltration, while at the same time possesses a porosity which will hold an amount of magnesium metal of at least 18%.

In addition to producing a product which has all of these advantages, the porous body of the instant material may be made with raw materials, which are readily available.

The density of the compacted ferrous metal network before impregnation is from 1.2 to 4.0 g/cc, while the density of the scrap metal pieces before compaction was 0.1 to 1.0 g/cc. Metal porous bodies containing amounts of magnesium metal from 18 to 55% may be produced by this process. Reproducible products are also readily obtained.

If the density of the compressed ferrous metal network is below 1.2 g/cc, the amount of magnesium which will infiltrate the compressed metal body will be above 55% by weight. At this upper weight limit the volume of magnesium will occupy 85% of the total volume of the infiltrated compressed metal body. With more magnesium in the infiltrated body, when used to desulfurize iron, the metal body will be structurally very weak as the magnesium is dissolved in the molten iron and the reaction will become too violent.

If the density of the compressed ferrous metal body is above 4.0 g/cc, the amount of magnesium which will infiltrate the compressed body will be below 18% by weight. When the magnesium content is below 18%, the amount of magnesium per unit weight of scrap metal is too low and therefore results in an uneconomical operation. In addition, if an excessive amount of scrap metal is added with the magnesium to the molten iron, the excess scrap metal may also chill the molten metal excessively. This cooling effect is to be avoided.

If the scrap pieces are too coarse and/or too dense, the briquettes will not hold together at the low fabrication pressures used. If high fabricated pressures are used, the briquette will not have sufficient porosity to be infiltrated with a sufficient amount of magnesium.

The scrap metal pieces useful in the instant invention include ductile iron and the like but more preferably steel. The scrap metal pieces as previously stated must fall within the size ranges specified above. If the scrap pieces used are too short, too thick, too wide or too flat, excessively high pressures would have to be used to obtain the structural strength necessary and therefore the compressed body would be excessively dense which would result in low percentages of magnesium infiltration.

The most desirable type of scrap metal are those which are irregular in shape and have a variety of sizes which fall within the sizes specified. Fine metal turnings, short shovelings and the like are the most desirable.

The compacted metal porous bodies prepared in the instant invention also may be impregnated with alloys. Alloys particularly desirable to use are magnesium alloys containing alkaline earth metals, aluminum, silicon and rare earth metals such as cerium, lanthanum, or rare earth alloys, such as "Misch Metal" and mixtures of these metals. The term "magnesium" hereinafter referred to is meant to include magnesium metal and alloys of magnesium metal.

The magnesium infiltrated compacted porous steel network structure produced in the instant invention possesses the following combined advantages over the prior art:

1. have high porosity and therefore are capable of retaining large quantities of magnesium metal;
2. the impregnated bodies produced ae structurally strong and capable of withstanding high temperatures until the magnesium has been released during subsequent treatment of molten iron,
3. the impregnated bodies produced are active when introduced into molten iron, thus capable of desulfurizing rapidly the molten iron without producing violent reactions. Reaction times to release the magnesium metal from the impregnated bodies may range from ½ to 10 minutes,
4. the magnesium infiltrated bodies made by the instant invention are uniform in composition and when they are used to treat molten iron, reproducible results are obtained,
5. the addition of the particular type of magnesium impregnated body employs iron or steel as the carrier and therefore does not introduce foreign carriers to the molten iron which subsequently would have to be removed from the molten iron,
6. the scrap metal may melt after the magnesium has been released thus contributing iron to the melt and eliminating the necessity of removing the carrier after the treatment.

Scrap metal generally contains a coating of oil. This coating may be removed before infiltration, if desired. One method of degreasing is by heating the scrap to burn off the oil. This heating may be done before or after compressing. It is economically advantageous, however, to compress the scrap metal then heat the compressed metal to remove the oil and to preheat the metal at the same time before it is introduced into the molten magnesium for infiltration.

If the compressed metal is preheated before introduction into molten magnesium, care should be taken to prevent the scrap metal from oxidizing excessively. The oxide present can react with magnesium metal and may contribute to the violence during the subsequent treatment of the ferrous melts and may consume a significant amount of magnesium, thus lowering the efficiency.

It has been found that the weight gain of the scrap metal compressed network due to oxidation should not exceed about 3% and preferably not exceed about 1% during the preheating step.

The amount of oxidation may be held within the limits specified if the preheating temperature in air is held between about 500° and 1000°F. Temperatures up to about 1200°F. may also be employed if the time of preheating is held to no more than about 1 hour.

Obviously the preheating temperature upper limits are not critical if the preheating is carried out in a non-oxidizing atmosphere.

Care should also be taken in the storage of the magnesium infiltrated bodies to avoid reaction of the magnesium with moisture. This may be readily accomplished by sealing the infiltrated bodies in a suitable container or placing the infiltrated bodies with a drying agent in a metal can having a tight fitting lid.

In order to describe the instant invention more fully the following examples are presented:

EXAMPLE 1

Fine steel turnings about 2 mils thick, 1/8 inch wide and 1 inch long were degreased with a chlorinated solvent. The degreased turnings had a density of 0.17 g/cc.

57 grams of the degreased turnings were dried and inserted in a compaction chamber (1 3/4 inch diameter × 3 inches high). The turnings were compacted at 1 tsi to produce a briquette 1 7/8 inch diameter × 0.7 inch high. The density of the briquette was 1.8 g/cc. The compacted briquette was preheated to 850°F. for 1 hour to remove the residual solvent. The amount of oxidation during the preheating step was less than 1%.

The briquette was then immersed in molten magnesium at 1350°F. for 5 minutes. After the infiltrated briquette was removed from the molten magnesium and cooled, the briquette was reweighed. It was found to weigh 102 grams and contained 44% magnesium metal by weight. The briquettes short transverse tensile strength (S.T.T.S.) before magnesium infiltration was 3.3 psi.

The operational details and the results obtained ae recorded in Table 1.

EXAMPLE 2

The infiltrated briquette prepared in Example 1 and another briquette prepared in the same manner were used to desulfurize molten iron.

These two briquettes were placed in a plunging bell which was inserted into a 400 pound melt of iron at 2650°F. The magnesium infiltrated into the briquettes was released at a moderate rate without violence or melt spillage in spite of the high concentration of magnesium (78 volume %).

The amount of sulfur in the molten iron was reduced from 0.041 to 0.013%.

The details of operation of the desulfurizing process are recorded in Table 2.

EXAMPLE 3

In this example steel turnings 5 to 10 mils thick, 1/8 to 1/2 inch wide and about 1 inch long were employed. The bulk density of this scrap was 0.57 gm/cc. The procedure described in Example 1 was used except that a 3 inch diameter briquette was produced in Example 3 with a compaction pressure of 4.2 tsi instead of 1.0. The compressed briquette was heated at 850°F. for 1 hour to burn off the oil.

The operational details and results obtained are recorded in Table 1.

EXAMPLE 4

In this example the briquette prepared in Example 3 was used to desulfurize iron. The method used for desulfurizing the iron was the same as that described in Example 2.

The operational details are described in Table 2.

EXAMPLE 5

This example is presented to show the preparation of briquettes in a manner similar to Example 3 except that the scrap steel was not totally degreased before infiltration with the magnesium.

406 gms. of scrap 5 to 20 mils thick, 1/16 to 3/8 inches wide, and about 1 inch long were placed in a die 3 inches in diameter and 6 inches deep. A pressure of 2.8 tsi was applied to the scrap by means of a ram. A briquette was formed measuring 3 1/8 inch in diameter and 1.06 inch thick and had a density of 3.04 g/cc.

The briquette was submerged into the molten magnesium for about 10 minutes and removed. 110 gms. of magnesium had infiltrated the briquette and it contained 21.7% magnesium.

The operational details are recorded in Table 1.

EXAMPLE 6

This example is presented to show the making of a briquette similar to the procedure described in Example 3 except that the briquettes were not preheated before being immersed into the molten magnesium.

Steel turnings 5 to 20 mils thick, 1/16 to 3/8 inch wide and about 1 inch long were degreased by trichloroethylene in a vapor degreaser. 395 gms. of degreased scrap were placed in a die 3 inches in diameter and 6 inches high. A pressure of 2.0 tsi was applied to the scrap producing a briquette 3 inches in diameter and 1 inch thick. The briquette had a density of 3.4 g/cc.

The briquette at room temperature was immersed into molten magnesium for about 10 minutes which was maintained at 1400°F. After removing the briquette from the molten magnesium, it weighed 505 gms. and contained 21.7% magnesium.

The operational details are recorded in Table 1.

EXAMPLE 7

In this example a briquette was produced as in Example 1 except that a compaction pressure of 2.5 tsi was used.

47.3 gms. of degreased fine steel turnings were placed in a die 1 3/4 inches in diameter and 3 inches high. After compaction the briquette had a diameter of 1 3/4 inches and was 0.60 inch thick and had a density of 2.4 gms./cc.

After preheating the briquette to 850°F. for 1 hour, it was immersed into molten magnesium and removed. The infiltrated briquette weighed 65.7 gms. and contained 31% magnesium.

The operational details are recorded in Table 1.

EXAMPLE 8

In this example a briquette was prepared in a manner as described in Example 1 except that a compaction pressure of 0.7 tsi was used.

8.14 gms. of degreased steel turnings were placed in a die 1 3/4 inch in diameter and 3 inches high. A pressure of 0.7 tsi was exerted on the scrap which formed a briquette 1 3/4 inch in diameter and 0.21 inch high with a density of 1.5 gm./cc.

The compacted briquette was then heated to 850°F. for one hour to degrease it. After degreasing the compacted briquette was infiltrated with magnesium by immersing it in molten magnesium. The infiltrated briquette weighed 17.5 gms. and was 53.5% by weight magnesium.

The operational details are recorded in Table 1.

EXAMPLE 9

A briquette in this example was prepared in a manner similar to the procedure described in Example 3 except that a briquette 5⅞ inches in diameter was made.

2270 gms. of steel turnings 5 to 10 mils thick, ⅛ to ½ inch wide and about 1 inch long were placed in a die cavity cylinder 5⅞ inches in diameter. The briquette was 1⅝ inch thick. A pressure of 3.5 tsi was used. The briquette was then heated to degrease it. The degreased briquette, which weighed 2180 gms., was infiltrated by immersing it into molten magnesium. The infiltrated briquette was 25% magnesium and weighed 2920 gms.

The operational details are recorded in Table 1.

As described above the magnesium infiltrated briquette of scrap iron have been used to desulfurize molten iron. In addition these briquettes are also useful for making nodular iron. The method is described in the following example:

EXAMPLE 10

In this example briquettes as prepared in Example 3 were used to nodularize iron. 400 lbs. of iron were heated to temperatures of 2640°F. Initially the iron contained 0.028% by weight of sulphur and no magnesium. By means of a plunging bell, 1797 gms. of the briquettes described above were added to the molten iron. The briquettes contained 395.34 gms. of magnesium per ton of iron or 0.2177% by weight.

By observing the amount of time that flaring occurred on the surface of the molten iron, it was determined that the magnesium had reacted completely in 3 minutes from the time of plunging. A sample of the nodularized iron was taken and the bell was removed. The magnesium content of the nodularized iron was 0.052% by weight and the sulphur content had been reduced to 0.007% by weight.

It was also determined that a sand casting of the nodular iron had the following mechanical properties:

| | |
|---|---|
| Tensile strength | 65,400 psi |
| Yield strength | 39,500 psi |
| Elongation | 14% |

As previously stated, the scrap metal pieces must be of size which falls within the limits specified above in order to obtain a network of interlocking pieces which has a porosity of 50 to 85% and a short transverse tensile strength of at least 2 psi.

Example 11 is presented to show the use of scrap metal pieces which are of size which falls within the specified limits. Example 12 shows the use of scrap metal pieces which are of size which fall outside the specified limits.

EXAMPLE 11

In this example 393 gms. of scrap steel pieces 5 to 10 mils thick, ⅛ to ½ inch wide and about 1 inch long were placed in a die 3 inches in diameter and 6 inches high.

A force of 3.5 tsi was exerted on the scrap producing a briquette 3 inches in diameter and 0.97 inches thick. The compacted briquette had a density of 3.17 gm/cc and a porosity of 59.7%.

A short transverse tensile strength was determined to be greater than 5.2 psi.

EXAMPLE 12

In this example 86.7 gms. of cast iron borings (−10 +200 mesh) were placed in a die 1¾ inches in diameter. A pressure of 6.25 tsi was exerted on the borings. A briquette 1¾ inches and 0.6 inches thick was formed. This briquette crumbled with only slight handling and was too weak to test for tensile strength.

From these two examples, it is apparent that the tensile strength of the metal network is unsatisfactory when metal pieces of size below the lower limits are used. In addition, it should be noted that the specified sizes and shapes of the scrap pieces enables the fabrication of briquettes of high strength at lower compaction pressures.

EXAMPLE 13

In this example scrap steel turnings similar to those described in the previous examples were used.

The scrap steel turnings weighing 22.4 pounds were placed in a ring shaped die measuring 15 inches outside diameter × 5 inches inside diameter × 6 inches thick. These turnings were then compressed at a load of 1000 tons maximum (6.4 tons/sq. in.) to produce a metal network measuring 15 inches outside diameter × 5 inches inside diameter × 1.2 inches thick. This compressed network was degreased in an oven at 1000°F. and was impregnated with magnesium metal by inserting the metal network in molten magnesium metal. The impregnated metal network contained 30% magnesium by weight.

The density of the metal network before impregnation was 3.29 gms/cc and had a porosity of 58%.

A plurality of these impregnated and compressed metal networks was used successfully to desulfurize a batch of molten iron.

TABLE 1

| | EXAMPLE NO. | | | | | | |
|---|---|---|---|---|---|---|---|
| | 1 | 3 | 5 | 6 | 7 | 8 | 9 |
| Iron Scrap (g) | 57 | 490 | 406 | 395 | 47.3 | 8.14 | 2270 |
| Die Diameter (in) | 1¾ | 3 | 3⅛ | 3 | 1¾ | 1¾ | 5⅞ |
| Die Height (in) | 3 | 6 | 6 | 6 | 3 | 3 | — |
| Piston Pressure (tsi) | 1.0 | 4.2 | 2.8 | 2.0 | 2.5 | 0.7 | 3.5 |
| Briquette Diameter (in) | 1⅞ | 3 | 3 | 3 | 1¾ | 1¾ | 5⅞ |
| Briquette Thickness (in) | 0.7 | 1.125 | 1.06 | 1 | 0.6 | .21 | 1⅝ |
| Briquette Density (g/cc) | 1.8 | 3.4 | 3.04 | 3.4 | 2.4 | 1.5 | 3.14 |
| Briquette Weight After Infiltration (g) | 102 | 615 | 515 | 505 | 65.7 | 17.5 | 2920 |
| % Magnesium in Briquette | 44 | 22 | 21.7 | 21.7 | 31 | 53.5 | 25 |
| S.T.T.S. psi | 3.3 | 5.6 | 4.5 | 2.9 | 3.2 | 2.9 | 2.5 |

TABLE 2

| | EXAMPLE NO. | |
|---|---|---|
| | 2 | 4 |
| Weight of Molten Iron Heat (ton) | 1/5 | 8 |
| Heat Temperature (°F.) | 2650 | 2580 |
| Initial Sulfur Content of Heat (%) | 0.041 | 0.03 |
| Amount of Infiltrated Magnesium (lb) | 0.30 | 10 |
| Reaction Time (sec) | 180 | 90 |

TABLE 2-continued

| | EXAMPLE NO. | |
|---|---|---|
| | 2 | 4 |
| Final Sulfur Content of Heat (%) | 0.013 | 0.010 |
| Residual Magnesium in Iron (%) | 0.015 | — |

From the above description and by the examples presented, a superior type of product has been produced which comprises a ferrous metal network having a low density, high porosity and high strength which may be infiltrated with high percentages of magnesium metal.

Such a product is superior to prior art products when used to desulfurize molten iron or to produce nodular iron.

While this invention has been described and illustrated by the examples shown, it is not intended to be strictly limited thereto, and other variations and modifications may be employed within the scope of the following claims.

We claim:

1. A process for producing porous ferrous metal network impregnated with magnesium which comprises selecting ferrous metal scrap pieces which have a density of 0.1 to 1.0 g/cc, said scrap pieces having lengths from ⅛ to 9 inches, widths from 1/64 to 1 inch and thicknesses from 1 to 100 mils, compacting said pieces using a pressure of from 0.5 to 8.0 tons per square inch to form a metal network having a density from 1.2 to 4.0 g/cc, a porosity of 50 to 85% and a short transverse tensile strength of at least 2 psi, immersing said metal network into a molten bath of magnesium to impregnate said network with said magnesium, the impregnated metal network containing from 18 to 55% by weight of the impregnated network and removing said impregnated network from said molten magnesium.

2. Method according to claim 1 in which the ferrous metal scrap pieces contain an oil coating and that the oil coating is removed by heating the scrap pieces to burn off the oil.

3. A process for producing a porous ferrous metal network impregnated with magnesium which comprises selecting ferrous metal scrap pieces which have a density of from 0.1 to 1.0 g/cc, said scrap metal pieces having lengths from ⅛ to 9 inches, widths from 1/64 to 1 inch and thicknesses from 1 to 100 mils, said metal scrap pieces having an oil coating on their surfaces, compacting said pieces using a pressure of from 0.5 to 8.0 tons per square inch to form a metal network having a density of from 1.2 to 4.0 g/cc, preheating said metal network at a temperature from 500° to 1200°F. to burn off the oil, the preheating time not exceeding one hour when temperatures of about 1200°C. are employed, and immersing said network into a molten bath of magnesium to impregnate the metal network with from 18 to 55% of magnesium by weight, based on the total weight of the impregnated network and removing said impregnated network from said molten magnesium.

4. Process according to claim 3 in which the weight gain due to oxidation of the metal network during the preheating step is held to no more than 3%.

5. Process according to claim 3 in which the impregnated metal network is removed from the molten magnesium and immersed into an oil bath to cool said impregnated network, said cooled impregnated network when removed from said oil contains an oil coating to prevent oxidation of the impregnated magnesium.

* * * * *